D'ORSAY McCALL WHITE.
DETACHABLE TRANSMISSION CONSTRUCTION.
APPLICATION FILED JAN. 10, 1920.

1,397,304.

Patented Nov. 15, 1921.

INVENTOR.
D'ORSAY McCALL WHITE.

BY
*Lockwood & Lockwood*
ATTORNEYS.

UNITED STATES PATENT OFFICE.

D'ORSAY McCALL WHITE, OF INDIANAPOLIS, INDIANA, ASSIGNOR TO LA FAYETTE MOTORS COMPANY, A CORPORATION OF DELAWARE.

DETACHABLE TRANSMISSION CONSTRUCTION.

1,397,304.     Specification of Letters Patent.     Patented Nov. 15, 1921.

Application filed January 10, 1920. Serial No. 350,527.

*To all whom it may concern:*

Be it known that I, D'ORSAY MCCALL WHITE, a subject of the King of Great Britain, a resident of Indianapolis, county of Marion, and State of Indiana, have invented a certain new and useful Detachable Transmission Construction; and I do hereby declare that the following is a full, clear, and exact description thereof, reference being had to the accompanying drawings, in which like numerals refer to like parts.

The chief object of this invention is to provide in a motor vehicle and the like a detachable connection between the universal joint and the driving shaft, and detachably secure adjacent and related parts so that ready access may be had to the transmission mechanism.

Another object of the invention is to detachably secure the torque tube to the transmission case so that the tube and shaft may be dropped when it is desired to remove the universal joint.

One feature of the invention is in including the universal joint within the transmission casing and inclosing the joint within a ball and socket construction secured to the transmission casing.

Another feature of the invention is the construction of the several parts heretofore mentioned so that the same may be readily assembled or disassembled.

The full nature of the invention will be understood from the accompanying drawings and the following description and claims.

Figure 1:
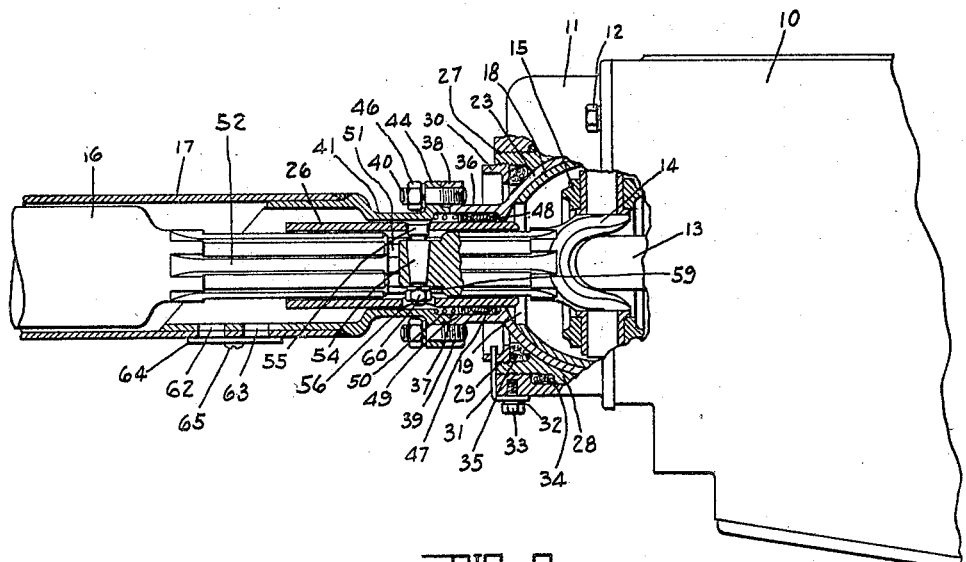
Figure 2:
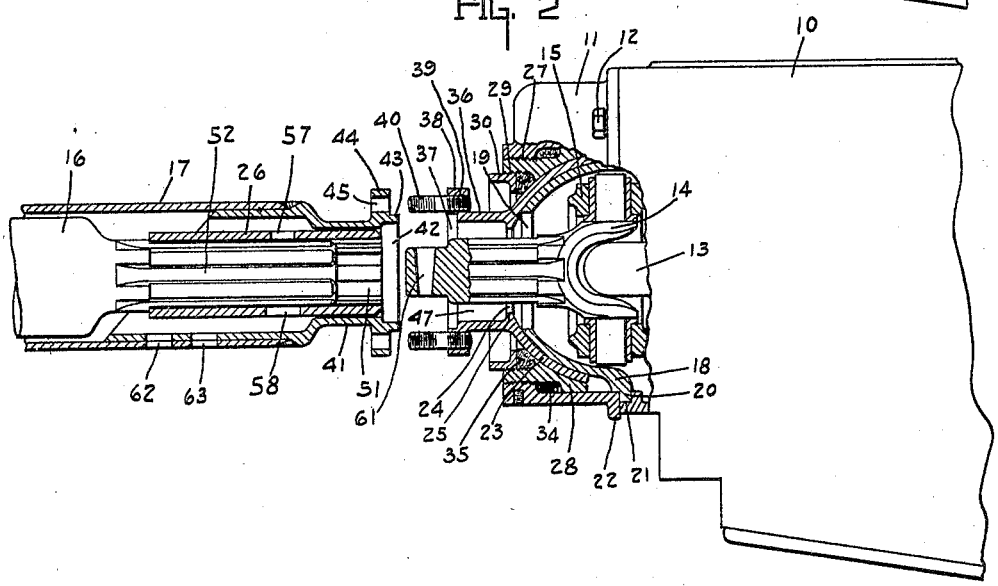

In the drawings Figure 1 is a central sectional view of the invention showing the parts in assembled relation. Fig. 2 is a similar view showing some of the parts unassembled.

In the drawings there is shown a transmission casing 10 provided with a housing 11 suitably secured thereto by means of bolts 12 or the like, said housing and casing inclosing and supporting a universal joint comprising a yoke 13, a yoke 14 and ring or bushing 15. The yoke 14 of the universal joint is detachably secured to the driving shaft 16, the same being surrounded by a torque tube 17, the latter being supported by the housing 11 and detachable therefrom in a manner to be hereinafter described.

The universal joint is mounted within the housing 11 in the following manner. An inclosing ball member 18 is provided with an opening 19 through which the yoke 14 extends. The ball is rigidly mounted within the housing 11 by having at one end an outwardly extending flanged portion 20, the same being seatable in a recess 21 and clamped therein by said housing, when the latter is secured to the transmission casing. An annular flange 22 is formed adjacent the flange 20 and abuts against said housing in the manner shown, so that said ball is rigidly mounted and centered within said housing. A complementarily formed ball socket 23 incloses said ball member and is provided with an opening 24, the same registering with the opening 19 formed in the ball member, and through which the yoke 14 extends. An annular inwardly extending flange 25 surrounds said opening 24 to provide a bearing, the same rotatably supporting a sleeve 26.

The socket member is pivotally supported within said housing 11 in the following manner. The housing 11 is provided with an annular threaded opening 27 in which a ball bearing or ring 28 may be secured. A central threaded opening 29 is formed concentric with the threaded exterior of the ball ring, and in the same is secured an annular nut or packing ring 30, said nut or ring being secured against rotation by means of an angularly formed locking pin 31, the same being suitably secured to the housing 11, as by means of a lock washer 32 and bolt 33. The packing 34 and 35 is secured between the housing 11 and the ball bearing 28 and ball bearing and packing ring or nut 30 respectively. By this means the socket member is pivotally mounted within the housing 11.

Extending outwardly from said housing, herein shown formed integral with the socket member 23, is a cylindrical portion 36, the same being concentric with the shaft or handle portion of the yoke 14 and suitably spaced therefrom. In the outer end of said cylindrical extension there is formed an annular seat or recess 37 and adjacent thereto is an outwardly extending annular flange 38, the same being provided with openings 39 in which are secured suitable bolts or screw members 40. The torque tube 17 is provided with a restricted portion 41 provided with an annular seat 42, said seat coöperating with the interior wall of the cylindrical extension 36. Upon the end of portion 41 is formed the annular portion 43, the same being seatable in the annular recess 37. Adjacent said annular projection 43 is an annular flange portion 44, the same being provided with openings 45 adapted to register with the openings 39, as shown. The bolts 40 extend through said openings 45 and secure the torque tube to the socket member by means of nuts 46. When said tube and socket member is in assembled relation to the annular recess or seat 42, the interior of said cylindrical extension 36 and the bearing 25 form a packing chamber 47, the same being adapted to receive the packing 48. The packing is held in position against the bearing 25 by means of a washer 49 and a coil spring 50, the latter being seatable between said washer and the seat 42.

The means for detachably securing said yoke and driving shaft with a driving connection comprises the sleeve 26, the same being provided upon its interior with splining slots 51. The driving shaft 16 is reduced at 52. The yoke shaft and portion 52 are provided upon their exteriors with complementarily formed splines, the same being seatable in the splining slots 51 formed in the sleeve 26, said sleeve being slidable upon said driving shaft and said yoke, as shown in the drawings. In the drawings the driving shaft is shown with the splines extending a considerable distance so that said sleeve may be restricted over said yoke and seated upon said driving shaft independently of said yoke, as shown in Fig. 2 of the drawing.

Means for securing said sleeve against longitudinal movement upon said driving shaft and said yoke, when the same are in assembled relation, comprises a tapered locking pin 54, the same being provided with a head portion 55 and a threaded stem portion 56. The sleeve 26 is herein shown provided with a pair of registering openings 57 and 58, the former being adapted to coöperate with the head portion 55 and the latter with the threaded stem portion 56 respectively. The head 55 locks the sleeve against longitudinal movement upon said splined shafts. Through said slot 58, and upon said stem 56, is secured a locking washer 59 and locking nut 60, the same as shown being within the exterior periphery of the sleeve 26, said tapered pin being secured in the tapered slot 61 formed in the yoke 14 as shown. With this construction no portion of said tapered pin, nut or washer extends beyond the exterior periphery of the splined sleeve 26 so that the same may rotate without interference within said torque tube and said socket member.

In operation the nuts 46 are removed from the bolts 40 which permits the axle and torque tube to be shackled back far enough so that access may be had to the nut 60, whereby the tapered pin 54 may be removed. When said pin is removed the sleeve 26 is slid longitudinally upon the driving shaft and out of engagement with the yoke 14, as shown in Fig. 2, said drive shaft and torque tube being thus separated from the transmission and the universal mechanism. When the bolts 12 are removed, the housing and all associated parts carried thereby may also be removed and the universal joint exposed for repairs, adjustment or removal as desired. From the foregoing it will also be understood the tension between the ball and socket members may be adjusted by means of the ball bearing or ring 28 and the packing ring or nut 35 in the manner described.

When the mechanism is to be assembled the housing 11 is replaced, and with it the socket member and associated parts. The drive shaft and torque tube is then alined with said yoke, as shown in Fig. 2. The torque tube is herein shown provided with a pair of adjacent openings 62 and 63, the same being normally closed by a spring cover plate 64 secured to the torque tube by the bolt 65, and being movable from over said openings so that access may be had to the sleeve 26. When the parts are in the position shown in Fig. 2, a screw driver or other tool may be inserted through the opening 62 and engage the rear end of the sleeve 26. Said tool then is used as a lever to force said sleeve forwardly as far as possible. The tool is then inserted in the opening 63 and projected forwardly the remainder of the distance until the sleeve is in the position shown in Fig. 1. The tapered bolt is then inserted in the tapered slot and secured therein in the manner described, thus locking the yoke and driving shaft together so that power transmitted to the former will be transmitted to the latter. The cover 64 is then replaced over the opening 62 and 63 respectively to prevent dirt or the like from entering the torque tube. The torque tube during the previous operation has remained in the position shown in Fig. 2, but is now positioned as shown in Fig. 1 after the packing 48, washer 49 and spring 50 have been inserted in the packing chamber 47 surrounding said sleeve and adjacent the bearing 25. The torque tube is then secured to the socket member by the nuts 46 and lock washers, as shown in Fig. 1.

From the foregoing it will be understood that the universal joint is housed within the transmission casing. It is readily accessible and may be removed therefrom, since the universal joint and the driving shaft have a detachable driving connection and said housing is detachably and pivotally connected with said torque tube through the socket member of the ball and socket housing of said universal joint. It will also be understood that wear between the ball and socket members may be taken up in the manner described, as shown in Fig. 1, said ball and socket members forming an inclosed chamber in which the universal joint operates, this chamber being adapted to contain any suitable lubricant or the like.

While the invention has been described in great detail in the foregoing specification it will be understood that the invention is not to be limited thereby, as many modifications thereof will suggest themselves to those skilled in the art.

The invention claimed is:

1. A transmission construction including in combination two adjacent and alining shafts having similarly splined ends, a sleeve having splined slots therein, said sleeve being slidable longitudinally on said shafts, said sleeve having a pair of openings on opposite sides thereof, one of said shafts having an opening extending transversely of said shaft and therethrough, said opening being adapted to register with the openings in said sleeve, a pin insertible in said opening, said pin having a head portion adapted to engage in one of said sleeve openings to secure the sleeve against sliding movement on said shafts, and means operable through the other sleeve opening for securing said pin in said shaft opening.

2. A transmission device including in combination a pair of splined shafts, a splined sleeve slidable thereon, one of said shafts having a tapered opening extending therethrough and registering with a pair of openings in the sleeve, a tapered pin insertible through one of said openings, means operable through the other opening for securing said pin and wedging the same in the tapered opening to lock said sleeve against sliding movement on said shafts, said locking means and said pin extending transversely of said sleeve and being of less length than the exterior diameter of said sleeve and tube surrounding said sleeve.

3. A detachable driving unit for motor vehicles, including a universal joint through which power is transmitted, a housing for said joint, a stub shaft connected with said joint and extending through said housing, a driving shaft in alinement with said stub shaft, a non-rotatable sleeve slidably mounted on the ends of said shaft for removably connecting them together, means on said driving shaft for permitting said sleeve to slide thereon out of engagement with said stub shaft, and a torque tube inclosing said drive shaft adapted to be removably connected directly to said housing, said tube having openings therein for permitting access to said sleeve whereby it may be moved to connecting or disconnecting position on said drive shaft.

In witness whereof, I have hereunto affixed my signature.

D. McCALL WHITE.